United States Patent
Perisic

(10) Patent No.: US 6,721,500 B2
(45) Date of Patent: Apr. 13, 2004

(54) APPARATUS FOR THREE DIMENSIONAL PHOTOGRAPHY

(76) Inventor: Zoran Perisic, Gwynfenton, Whitewell Road, St. Teath, Cornwall (GB), PL 30-3LH ( * ) Notice: Subject to any disclaimer, the term of this patent is extended or adjusted under 35 U.S.C. 154(b) by 0 days.

(21) Appl. No.: 10/062,333

(22) Filed: Feb. 1, 2002

(65) Prior Publication Data

US 2003/0133707 A1 Jul. 17, 2003

(30) Foreign Application Priority Data

Jan. 17, 2002 (GB) .............................. 0201047

(51) Int. Cl.$^7$ ................ G03B 35/00; G03B 35/16; G02B 27/22
(52) U.S. Cl. ................ 396/331; 352/65; 359/462
(58) Field of Search ................ 396/322, 323, 396/331, 333, 324; 352/65; 359/462

(56) References Cited

U.S. PATENT DOCUMENTS

| | | | | | |
|---|---|---|---|---|---|
| 862,354 | A | * | 8/1907 | Stevens | 396/331 |
| 2,403,733 | A | * | 7/1946 | Mainardi et al. | 396/331 |
| 2,413,996 | A | * | 1/1947 | Ramsdell | 396/331 |
| 3,990,087 | A | * | 11/1976 | Marks et al. | 396/331 |
| 4,437,745 | A | * | 3/1984 | Hajnal | 396/331 |
| 5,581,314 | A | * | 12/1996 | Yoneyama et al. | 396/331 |
| 5,727,239 | A | * | 3/1998 | Hankawa et al. | 396/322 |

* cited by examiner

*Primary Examiner*—Christopher Mahoney
(74) *Attorney, Agent, or Firm*—Roger A. Marrs

(57) ABSTRACT

An apparatus 1 provides left and right eye images to a conventional camera lens 7 such that the images are recorded by the camera 3 as head-to-head images. The apparatus 1 includes left and right plane mirrors 11, 12 that direct light rays from the left and right images onto respective faces of a triangular prism 9, the triangular prism directing the light rays to the camera lens 7. Alternatively, the apparatus may be incorporated within a camera lens, being located between the front and rear lens group of the camera lens. The plane mirrors 11, 12 can be moved along their image axes, effectively adjusting the interocular distance of the apparatus. The angle which the plane mirrors 11, 12 subtend to each other and to the triangular prism 9 may also be adjusted, thus adjusting the convergence of angle of view of the apparatus. The apparatus may also be attached to the front of a projector lens, or alternatively incorporated within a projector lens, such that images recorded as head-to-head images using the apparatus can be viewed as three dimensional images. The 3D images may also be viewed with the naked eyes using a viewing box 36.

5 Claims, 8 Drawing Sheets

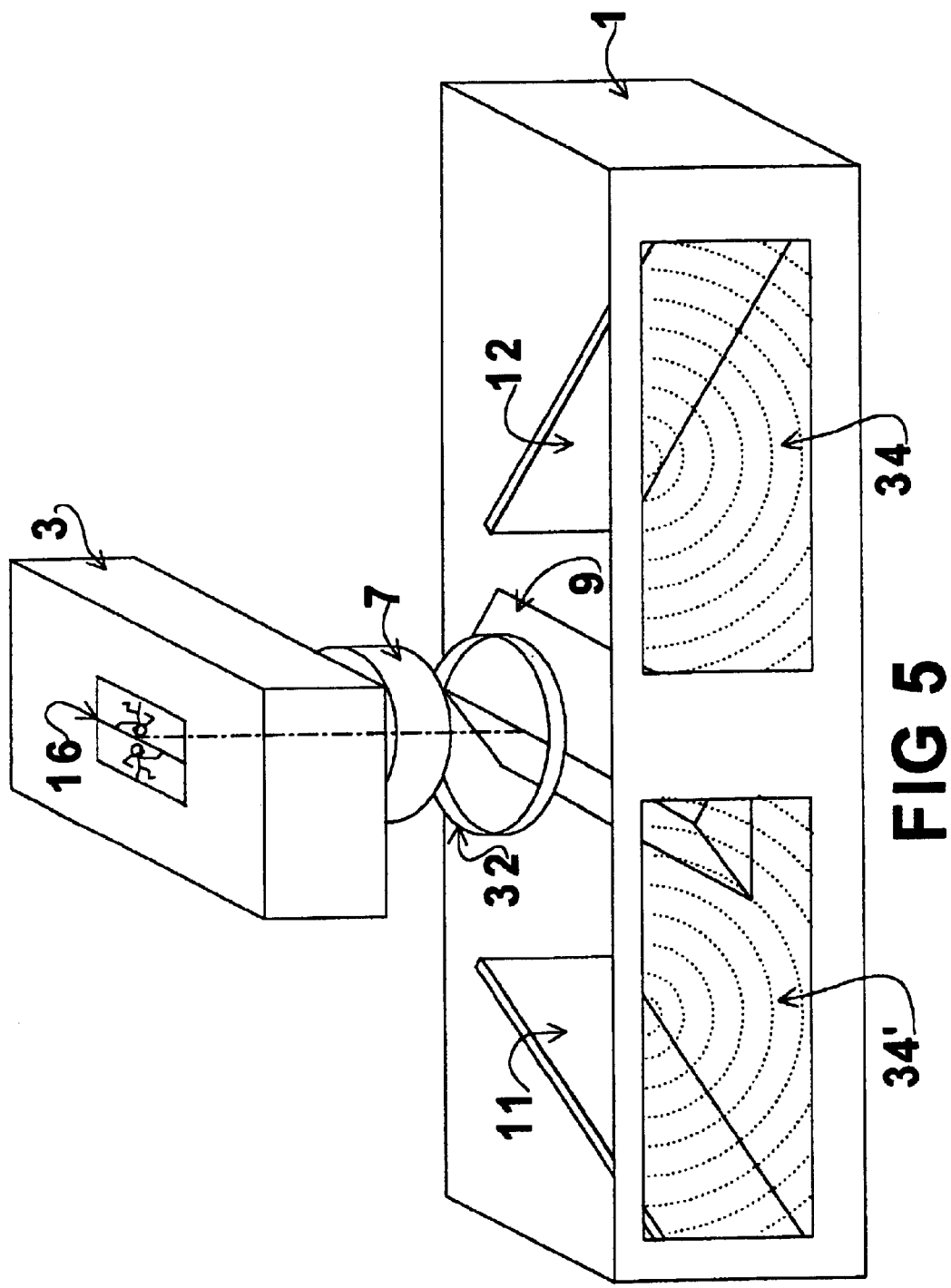

APPARATUS FOR THREE DIMENSIONAL PHOTOGRAPHY

The present invention relates to apparatus for generating left and right eye images for three-dimensional photography, cinematography and videography and the means of viewing those images to produce a full stereoscopic effect.

Three-dimensional photography is achieved by recording separate left and right eye images. One technique for recording the separate left and right eye images is to use separate lenses and/or optical arrangements for the separate left and right eye images and to alter the optical properties of each image, for example by using different colour filters for the left and right eye images such as blue for one eye and red for the other, and to record the optically different images together on a recording medium so as to provide a single composite image. When viewed with suitable viewing devices, for example blue/red glasses, the composite image provides a three dimensional effect. However, because opposite colour filters are used to cancel out each other so that each eye would see only the appropriate image the resultant stereoscopic image is essentially monochromatic. This is known as the anaglyph method.

A more effective method was developed whereby the two stereoscopic views are recorded as separate images in full colour. The left and right images are projected simultaneously onto a front projection screen coated with a metallic surface. The separation between the two images is accomplished by means on polarizing filters placed in the projection beam of the left and right image with polarizing axis set at 90° to each other and therefore cancelling each other. To ensure that each eye sees only the corresponding image the stereoscopic scene is viewed through glasses with polarizing filters whose polarizing axis are set at 90° to other. The resultant stereoscopic image is in full colour. The stereoscopic images can be recorded by various means from two cameras set side by side to a split lens system designed to record a stereoscopic pair of images side by side or one image above the other. The latter scheme is known as the 'over-under' approach.

An alternative technique has also been developed for cinematography whereby the discrete left and right eye images are recorded separately and sequentially on the image recording medium. One way of achieving this is to record the left and right images on alternate sections of the image recording medium, i.e. on alternate frames of photographic film. The images can be viewed either by simultaneously projecting both the left and right eye images through an optical arrangement that superimposes both images onto the screen or by projecting the images sequentially at double the normal frame rate. Crossed polarising filters are placed in the projected beam of the appropriate image. The images are viewed through glasses with polarising filters whose polarisation axes are at 90° to one another corresponding to the polarisation axes of the projected images. However in the case of the "over-under" method, where a single projection lens and additional optical arrangements are used to project both images the projection arrangement has a detrimental effect that the optical distortions introduced by the optical elements required to image the separate left and right images, mainly spherical aberrations, tend to be exaggerated when the two images are superimposed onto each other for viewing. A perfect match between the two images is not possible because both images are part of the same image circle, i.e. the top corners of the upper image really match the bottom corners of the lower image instead of the corresponding corners.

It would therefore be advantageous to provide apparatus for recording and viewing three-dimensional images that has the advantages of the present known systems, but that mitigates the known disadvantages of these systems.

According to a first aspect of the present invention there is provided an apparatus for providing left and right eye images along the axis of a camera lens, the apparatus comprising optical means arranged to provide said left and right eye images, whereby the left and right eye images may be simultaneously recorded as a pair of head-to-head images.

It is therefore possible to provide optical apparatus that records separate left and right eye images onto a single frame of a photographic film, or other recording medium, with the left and right eye images being recorded in a head-to-head format, i.e. when the frame is viewed directly, one image appears to be upside down above the other.

Preferably, the optical means comprises first and second optical elements arranged to receive the left and right eye images respectively and a further optical element arranged to receive said left and right eye images from said first and second optical elements and to provide said left and right eye images along the axis of the camera lens. The camera lens may be of a standard focal length i.e. 50 mm for a 35 mm format.

Preferably, the apparatus includes interocular adjustment means arranged to adjust the distance between the image axes of the first and second optical elements such that they are separated by a distance substantially consistent with the interocular distance of natural eyes. The interocular adjustment may be effected by synchronously moving the first and second optical elements along their respective image axes, thus resulting in a variation in the separation between the image axes.

Preferably, the apparatus includes convergence adjustment means, wherein the convergence of the axes of the left and right eye images as received by the apparatus can be adjusted. Preferably, the convergence adjustment means comprises an adjustment mechanism for adjusting the angle at which the first and second optical elements are set in relation to each other and to said further optical element. The convergence adjustment means may comprise a rotary adjustment mechanism. Preferably, the first and second optical elements are interconnected by a mechanical linkage, wherein the first and second optical elements are constrained to being arranged at the same angle of convergence with respect to the further optical element.

Preferably, the apparatus further includes an afocal optical element arranged to provide a relatively wide angle of view of the apparatus of approximately 60°. Preferably, the afocal optical element comprises a pair of optically identical first afocal lenses or lens groups of negative optical power, each first afocal lens or lens group being located along the respective axis of the left and right eye images and in front of said first and second optical elements. The afocal optical element further comprises a second afocal lens group, of positive optical power, located along the axis of the camera lens between the camera lens and the further optical element such that both left and right eye images are incident on the second afocal lens group. Preferably, the optical members comprising the first afocal group are each placed in front of said first and second optical elements in correct optical alignment with the optical axis of the camera lens. The two members of the first afocal group join together optically to form a circle—an optically cohesive unit preserving the spherical properties of the system.

Preferably the front lens group comprises a pair of individual half optical elements, each half optical element being placed in front of said first and second optical elements in correct optical alignment with the optical axis of the camera lens. These two halves join together optically to form a circle—an optically cohesive unit preserving the spherical properties of the system.

Preferably, both members of the first afocal group are coupled to the convergence adjustment means, wherein operation of the convergence adjustment means causes adjustment of the pair of first optical elements.

Preferably, the first and second optical elements comprise plane mirrors and the further optical element comprises a triangular prism, the plane mirrors each being arranged to reflect the light rays of the left and right eye images respectively onto opposing faces of the triangular prism, the triangular prism being arranged to redirect said incident light rays the camera lens.

Additionally or alternatively, the second afocal lens group of positive power may be replaced or augmented by parabolic mirrors placed in the position and/or in place of the reflecting prism surfaces.

Preferably, the optical apparatus is arranged to be coupled to a conventional lens of a camera or other image recording or viewing device.

According to a second aspect of the present invention there is provided an integrated camera lens for imaging left and right eye images, the camera lens comprising front and rear lens groups and a further optical element located therebetween, the further optical element comprising optical means arranged to provide the left and right eye images along the axis of the camera lens, whereby the left and right eye images may be simultaneously recorded as a pair of head-to-head images.

Preferably, the camera lens includes one or more of the preferred features of the apparatus according to the first aspect of the present invention.

According to a third aspect of the present invention there is provided apparatus for use in viewing a three-dimensional image, the apparatus comprising optical means arranged to simultaneously receive left and right eye images in the format of a pair of head-to-head images and to provide a superimposed projected image comprising the left and right eye images to a viewing screen.

Preferably, the optical means comprises first and second optical elements arranged to respectively receive the left and right eye images.

Preferably, an interocular adjustment means is provided to adjust the separation of the image axes of said first and second optical elements. For projection purposes the interocular distance between the axes of the left and right images can be much greater than the interocular distance of natural eyes.

Additionally or alternatively, the apparatus also preferably includes means for adjusting the angle of incidence of said first and second optical elements to the centre axes of the respective left and right eye images, whereby the convergence of said left and right eye images is adjustable.

Preferably, the apparatus includes afocal adjustment means arranged to provide an angle of projection of said superimposed image from said apparatus of approximately 60°.

Preferably, the optical means is arranged to be coupled to the front of a projection lens. Alternatively a composite projection lens including said optical means may be coupled directly to the projector.

The apparatus may further include polarising means for polarising the left and right eye images, whereby the superimposed composite image may be viewed using corresponding polarising filters to perceive a three-dimensional image, when projected onto a suitable metallic surface.

The apparatus may further include a viewing device comprising a viewing box into which said superimposed image is provided, the viewing box having one or more reflective surfaces that are arranged to project the composite image onto a side wall of said viewing box, the viewing box further comprising a viewing window through which said projected image may be viewed. The viewing box may further include polarising means for polarising the left and right eye images.

Alternatively, an optical element may be provided on the side wall of the viewing box on which the composite image is projected, the optical element being arranged to reflect incident light rays back along their axes, whereby a three-dimensional image may be viewed without the use of polarising elements. Preferably, the optical element may comprise front-projection material. The optical element, or front projection screen, may be placed at a distance, i.e. remote from the viewing box.

A camera lens placed in the position of the viewer and aligned correctly along the corresponding axes of the projection apparatus will be able to record either the left or the right eye image reflected from the projection screen and with a 3D apparatus attached to the camera lens both stereoscopic images may be recorded simultaneously. Moreover a subject placed within the field of view of the 3D apparatus and lit appropriately will be recorded as a three-dimensional composite image, i.e. it will blend in and become a part of the projected image. This can be particularly effective when the projected image has some foreground elements as well as the distant background and the "subject" is placed at middle distance. By the manipulation of the convergence points the "subject" can be integrated seamlessly into the projected image.

The same viewing box can be used to view three-dimensional images recorded by means of the first or second aspects of the present invention and reproduced in the form of photographs, videos or computer images. The head-to-head image is transferred by means of an arrangement of lenses acting as a relay to apparatus as described in the first and second aspects of the present invention and projected as a composite image onto the screen. A three-dimensional video image can be viewed in real time when a device is also attached to a video camera lens.

The viewing box can also be used for direct three-dimensional viewing (a three-dimensional periscope) utilizing the relay system with a device attached at both ends, the first device acting as a taking system that creates the left and right images and the second device as a projection system that superimposes the two images onto the viewing screen inside the box.

Advantages of the apparatus and camera lens of the present invention include the single camera system, the correct interocular distance corresponding to that of the average human eyes, variable convergence control mimicking the movements of the human eyes in the horizontal plane and wide angle of view corresponding to the stereoscopic (binocular) field of view of the average human eyes.

Another advantage of the apparatus and camera lens of aspects of the present invention is that it does not compound the spherical aberrations of the recorded images, because the left and right eye images are recorded as head-to-head images, and as such are effected equally by the spherical aberrations. When the two images are superimposed for viewing the optical distortions effectively cancel one another. The quality of the perceived three-dimensional image is therefore improved.

An embodiment of the present invention will now be described, by way of example only, with reference to the accompanying figures, in which:

FIG. 1 schematically illustrates apparatus according to an embodiment of the present invention;

FIG. 2A schematically illustrates a photographic frame on which left and right eye images have been recorded in a horizontal format by apparatus according to an embodiment of the present invention;

FIG. 2B schematically illustrates a photographic frame on which the left and right eye images of FIG. 2A have been recorded in a vertical format.

FIG. 3 schematically illustrates the optical path of light rays through the apparatus of the present invention;

Figure 1:
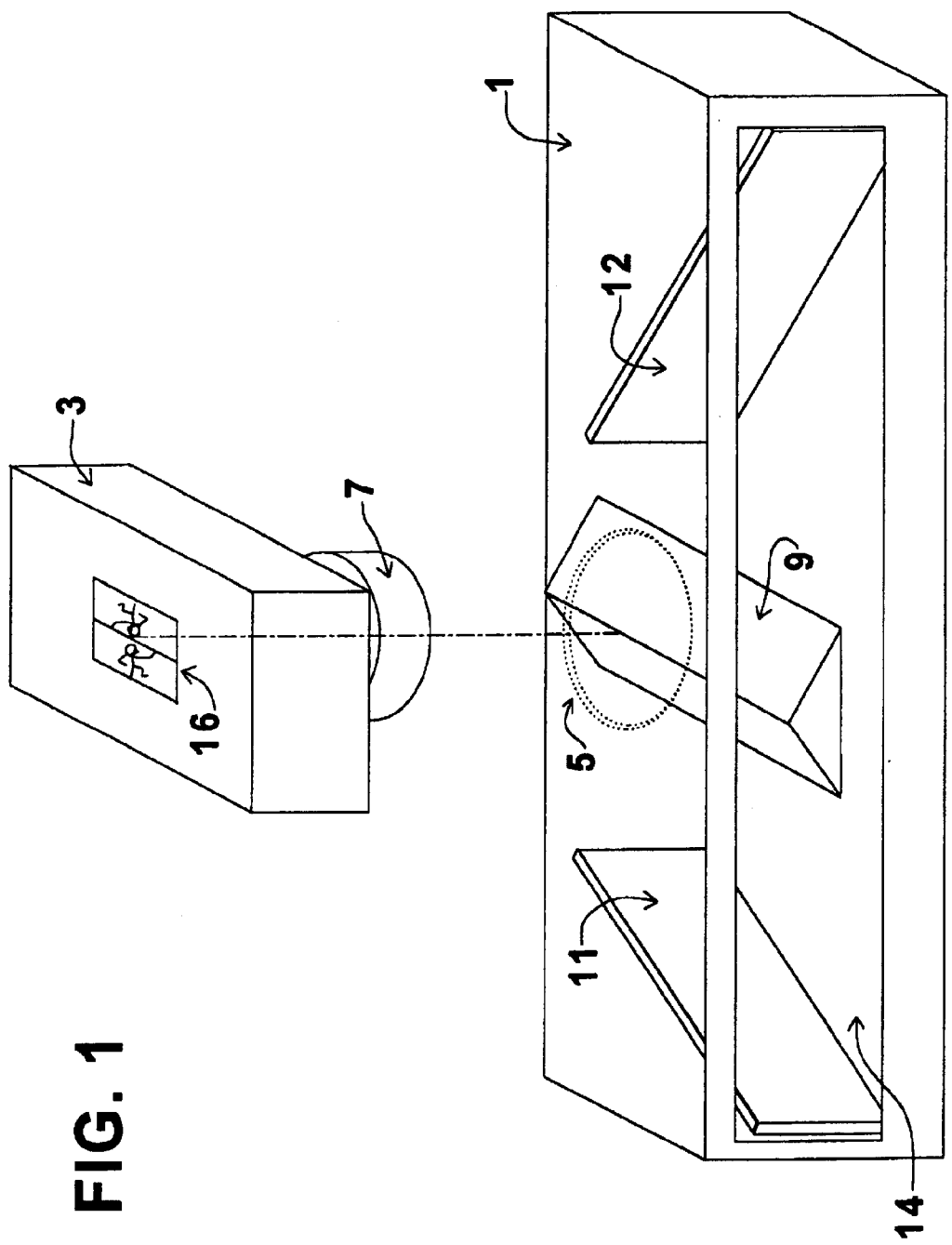
Figure 6:
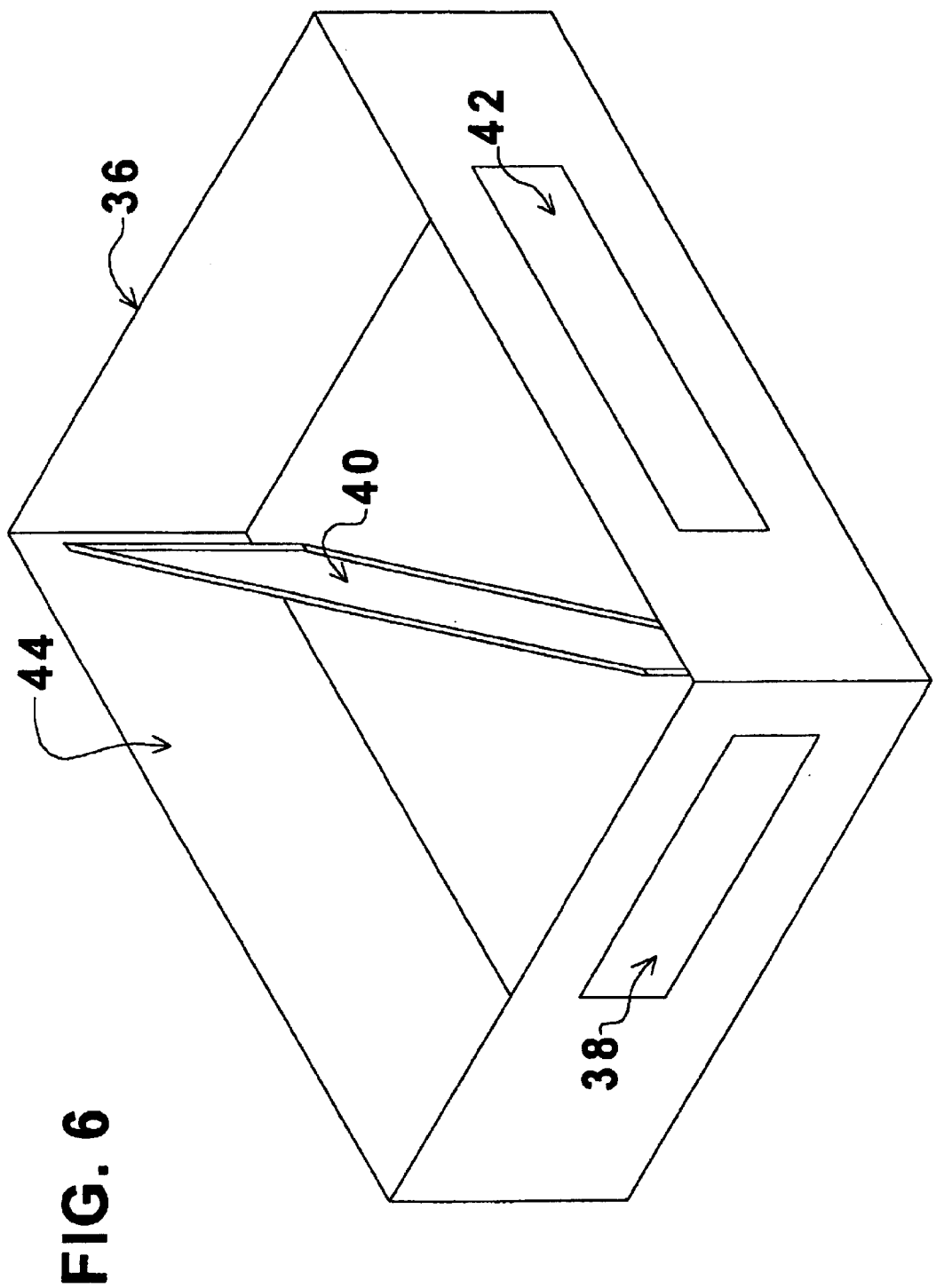
Figure 7:
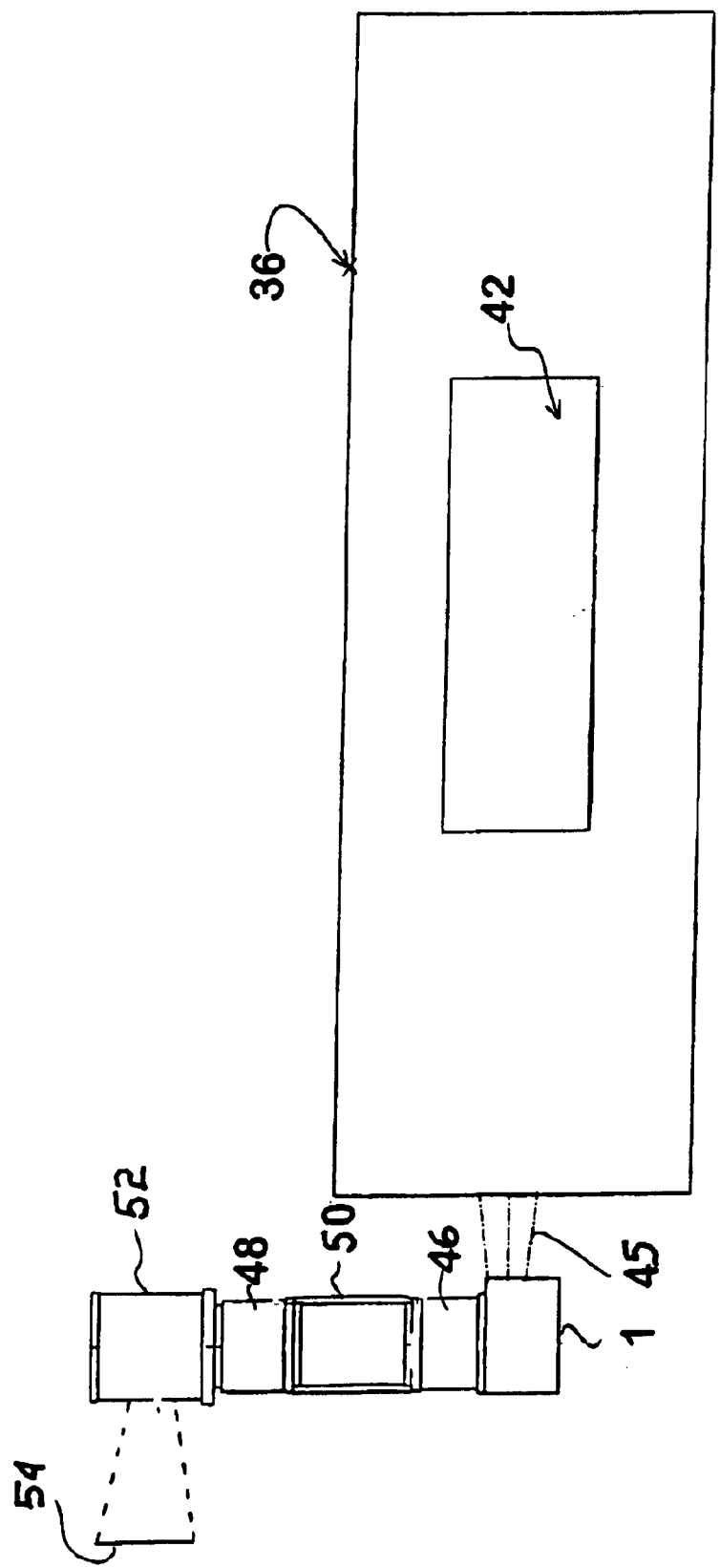
Figure 8:
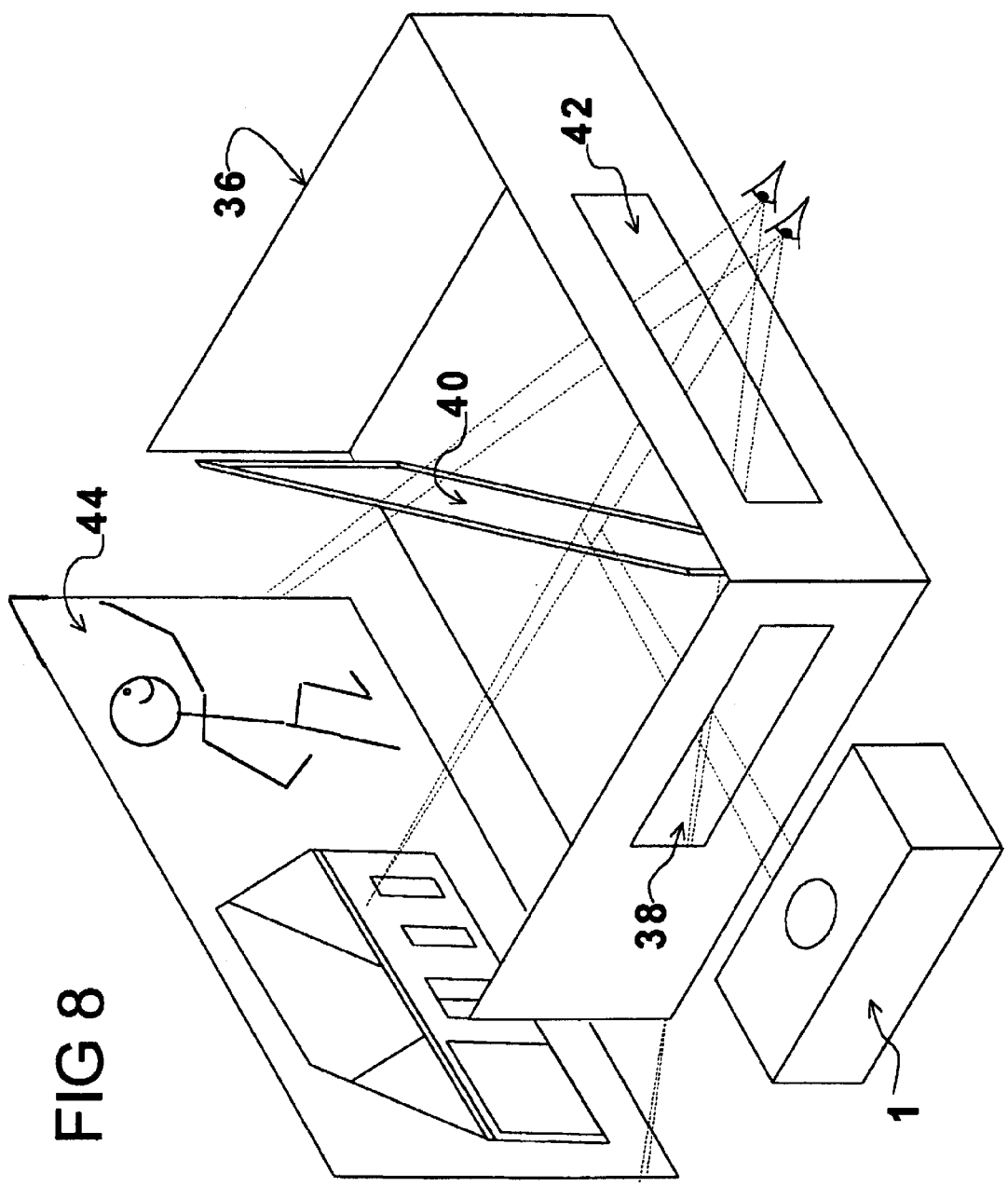

FIG. 5 schematically illustrates the location of afocal adjustment lenses according to an embodiment of the present invention;

FIG. 6 illustrates a viewing device in accordance with embodiments of the present invention;

FIG. 7 shows a further view of the viewing device shown in FIG. 6 together with the apparatus shown in FIG. 1; and FIG. 8 schematically illustrates the light paths within the viewing device shown in FIG. 6.

FIG. 1 schematically illustrates apparatus according to an embodiment of the present invention. The apparatus 1 is arranged to be coupled to a conventional camera 3 by means of a coupling ring 5. The camera 3 may be a conventional 35 mm camera or the like, or may equally be a video or cinematographic camera. The camera 3 has a lens 7 to which the coupling ring 5 of the apparatus 1 is attached, for example utilising the screw thread provided on conventional camera lenses. Located along the axis of the camera lens and coupling ring 5 is a triangular prism 9 arranged so that two of the prism faces are directed towards the camera lens 7. The prism faces are coated and act as front-surface plane mirrors. Alternatively small front-surface mirrors can be attached to the faces of the prism. Located on the same plane as the triangular prism 9, and therefore at substantially 90° to the camera axis, are two plane mirrors 11, 12. An aperture 14 is provided in the front face of the apparatus 1 through which light rays may be received. The plane mirrors 11, 12 are arranged at an angle to the triangular prism 9 such that light rays received through the aperture 14 are reflected onto respective faces of the triangular prism 9. The light rays received from a scene by the plane mirror 12 constitute a left eye image, whereas the light rays received by the plane mirror 11 constitute a right eye image. The prism 9 redirects the left and right eye images to the camera lens 7 such that they are recorded on the focal plane 16 of the lens at which a photographic recording medium is located. The left and right eye images are recorded on a standard frame in a head-to-head format.

Figure 2B:
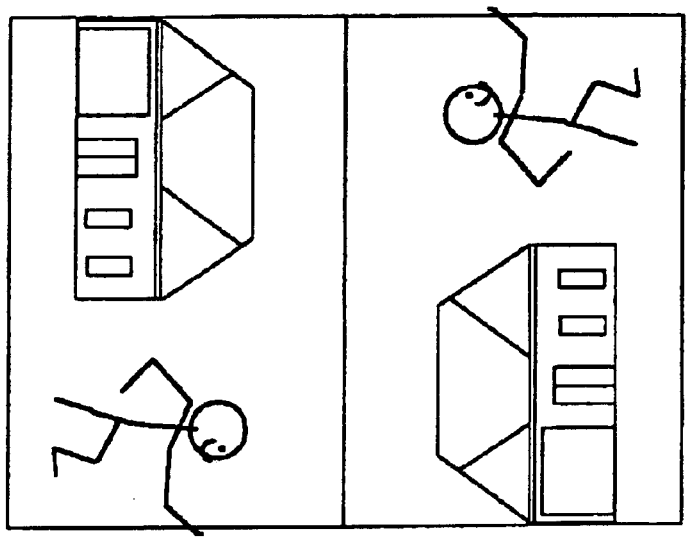
Figure 2A:
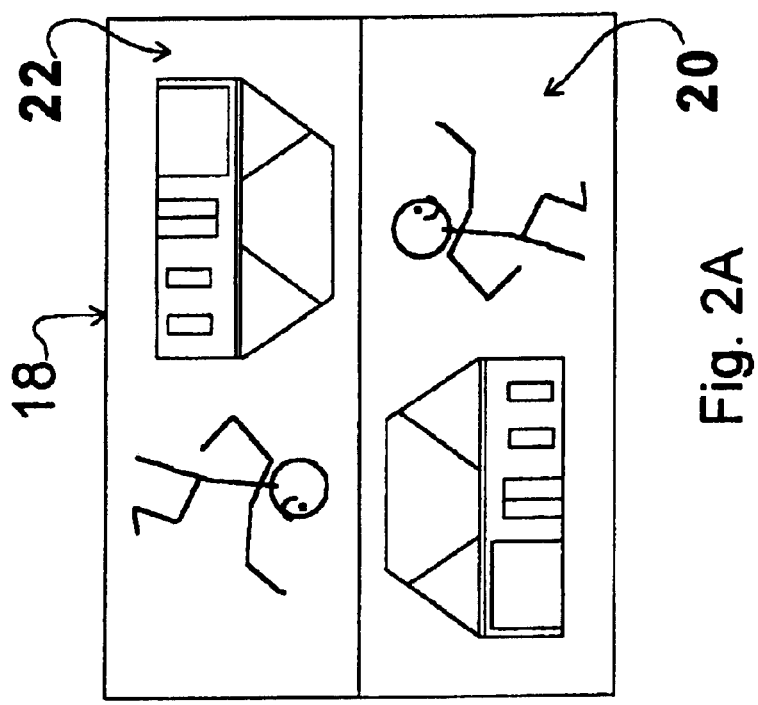

FIGS. 2A and 2B schematically illustrates the format in which the left and right eye images are recorded. FIG. 2A illustrates a complete photographic frame 18. On the lower half of the frame 18 is recorded the right eye image 20 of a scene and on the upper half of the frame 18 is recorded the left eye image 22 of the same scene. It can be seen that the left and right eye images are recorded as head-to-head images, by which is meant that the elements of one image appear to be upside down with respect to corresponding elements of the other image. However, it will be noted that the left and right images are not simply recorded as mirror images along a line of symmetry intersecting the frame 18, but are laterally reversed with respect to one another. The standard frame can be split either along the horizontal center line as illustrated in FIG. 2A, producing an aspect ratio of 3:1, or with the camera rotated 90° the frame can be split along the vertical center line as illustrated in FIG. 2B, producing an aspect ratio of 1.3:1. Horizontal split has the advantage of a wider angle of view and the vertical split has more head room which may be useful in certain circumstances. In both cases the images are rectangular in shape with the horizontal axis longer than the vertical one.

Figure 3:
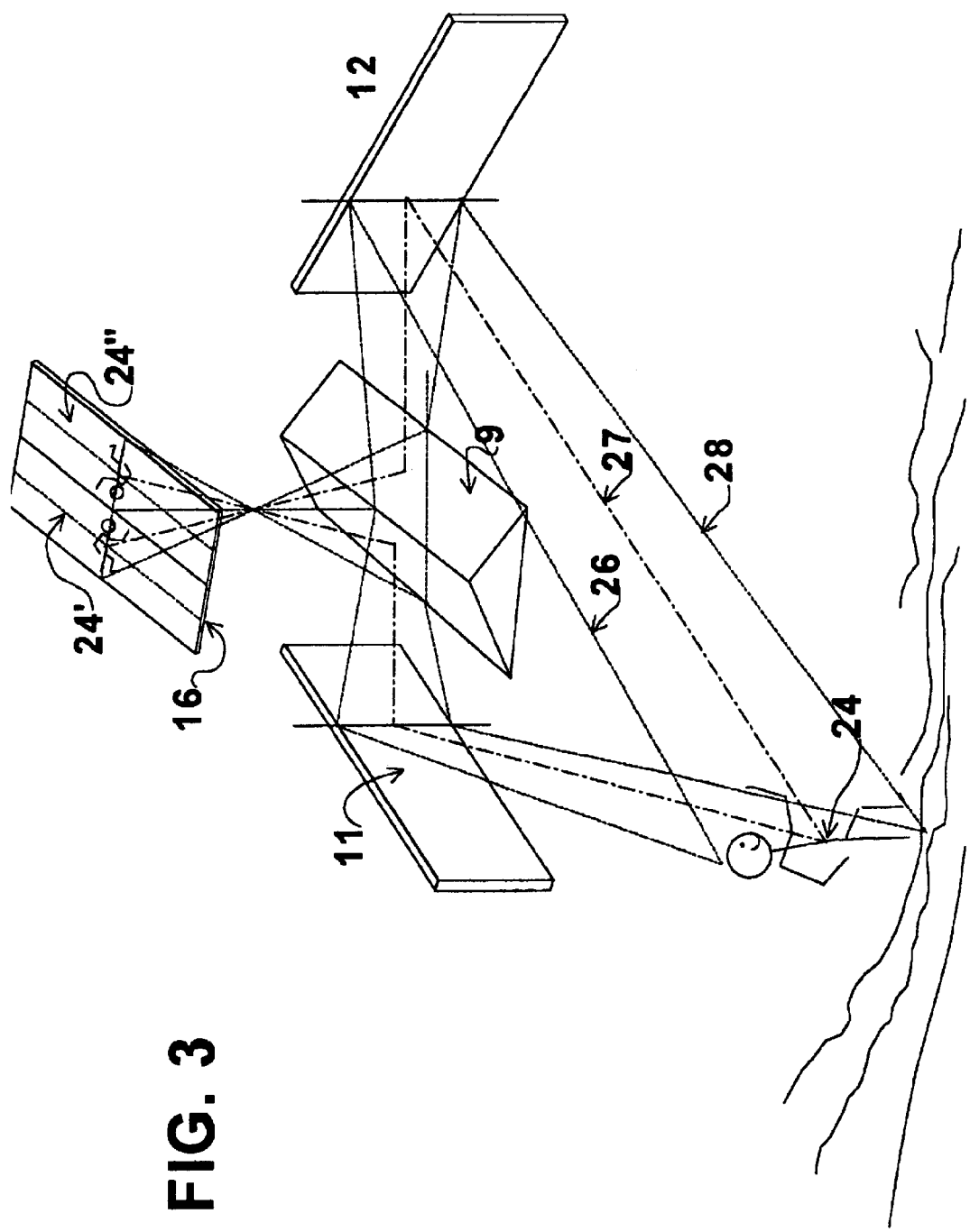

FIG. 3 schematically illustrates the optical path of light rays through the apparatus shown in FIG. 1. The object on which the apparatus is converged is depicted by the arrow 24. To aid clarity, only three light rays 26, 27 and 28 are illustrated. By following the illustrated light rays 26, 27 and 28 it will be seen that the prism 9 causes the separate left and right images 24' and 24" to be formed on the focal plane 16.

Each plane mirror 11, 12 is mounted on an adjustment mechanism (not shown) such that some degree of rotational adjustment about the vertical axes of the mirrors is possible. This allows the angle that the mirrors 11, 12 subtend to the faces of the prism 9 to be adjusted, which moreover also adjusts the angle of convergence of the images 24' and 24". Preferably, the adjustment mechanism of each mirror is coupled to one another such that a single adjustment control may be utilised to adjust both mirrors, and both mirrors are adjusted in synchronism. One method is to mount the mirrors onto two meshing gears so that the reflecting surface of the mirror runs through the pivot point of the gear. As one gear is rotated in one direction it automatically rotates the second gear in the opposite direction. However, it will be appreciated that other adjustment mechanism may also be used.

It has been found that the angle of convergence is particularly important in order emulate what the eyes of an observer see if they were standing at the same position as the camera at the time of image capture.

Figure 4A:
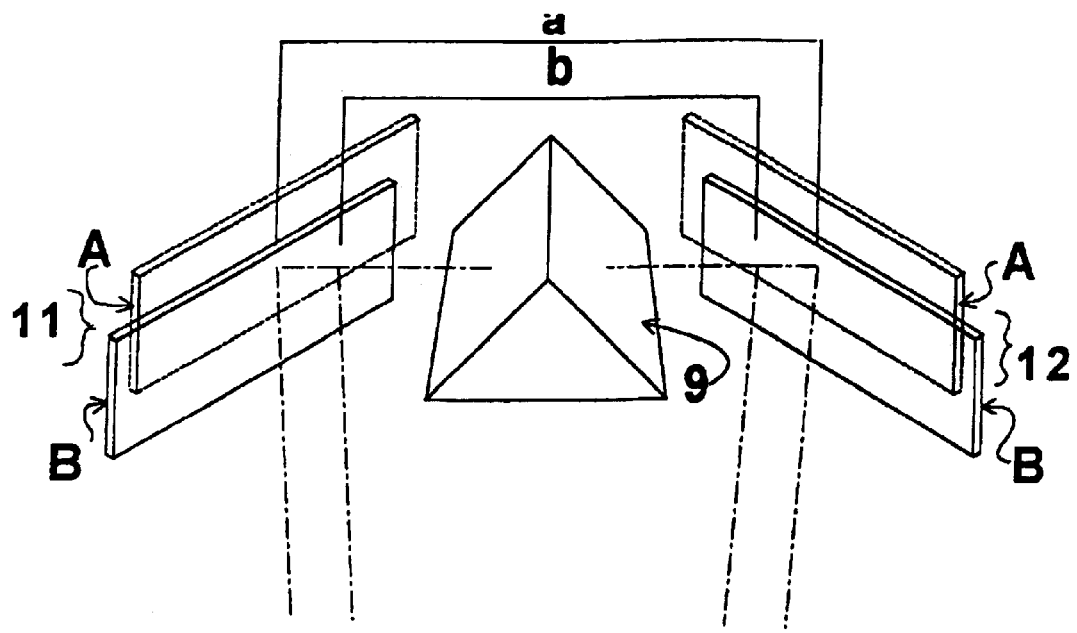
FIG. 4A illustrates the adjustment of the interocular distance as it is applicable to embodiments of the present invention.

The distance between the image axes of the plane mirrors 11 and 12 is also preferably adjustable. This distance is known as the interocular distance and it has been found that for a realistic three-dimensional impression to be gained, the interocular distance must be substantially the same as that of the eyes of the viewer. This distance is generally between 60 and 75 mm and it is therefore this distance and range of adjustment that is preferably provided in the apparatus 1 according to the present invention. Referring to FIG. 4A, when the plane mirrors 11 and 12 are moved together along their respective image axes from position A to position B, preferably in alignment with the longitudinal axis of the prism 9, the image center axes intercepted by the mirror surfaces 11 and 12 are at a different point resulting in the interocular distance at position B, represented by arrow b, being smaller than that at position A, represented by arrow a.

Figure 4B:
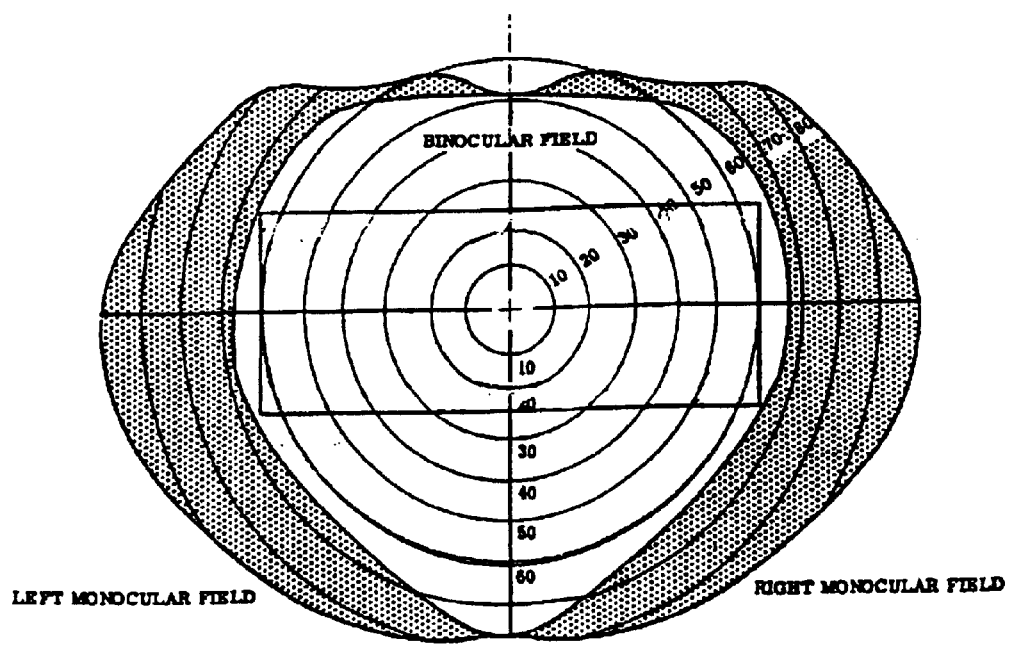
FIG. 4B illustrates the coincidence of a 60° field of view with the binocular field.

A standard camera lens, i.e. 50 mm for 35 mm film format, typically covers a horizontal angle of view of approximately 40°. It has been found, however, that to achieve a more realistic three-dimensional impression it is desirable to use a wide angle lens element for each eye image to substantially match the natural binocular horizontal field of vision. This is illustrated in FIG. 4B, which shows the binocular field—the overlap area of the left and right eye monocular fields. Concentric circles represent the angles of view. It can be seen that the 60° circle corresponds best to the rectangular shape of a standard frame B for a 3:1 aspect ratio.

Therefore, ideally the lens elements should have an angle of view of 60° in order to substantially match this natural horizontal field of vision. According to a further embodiment of the present invention this is achieved by placing a lens or lens group of positive power in the path of the light rays between the prism 9 and the lens 7 of the camera and placing a further lens or lens group of negative power in the path of the light rays forming the left and right eye images prior to the light rays being incident on the plane mirrors 11 and 12. Because the light rays from the left and right eye images respectively only form one half of the image formed on the focal plane 16, the lens groups placed before each of the plane mirrors 11 and 12 may be of the semicircular "half moon" type to best match the optical alignment of the primary camera lens where imaging properties of these two half-lenses are joined optically to form an optically cohesive unit and avoid adding spherical aberrations to the system. This is illustrated schematically in FIG. 5 where a lens group 32 is shown located between the apparatus 1 of the present invention and the camera 3, and separate half moon lenses 34 and 34' are shown located in front of the left and right plane mirrors 11, 12 respectively.

In a further embodiment of the present invention the imaging apparatus 1 shown in FIG. 1 may be integrated into a suitably selected lens. To achieve this the lens must be of such a construction that there is sufficient space in-between the primary and secondary lens groups in which to locate the apparatus 1 of the present invention. An example of such a suitable lens is that designed by G. H. Cook and illustrated in U.S. Pat. No. 2,724,993, the relevant disclosures of which are incorporated by reference herein.

The apparatus required to view the recorded images so as to experience the three-dimensional impression is dependent upon the recording medium used to record the initial left and right eye images. If the left and right eye images were recorded on conventional photographic transparency film or as a moving image by a cine camera then the three-dimensional image may be viewed by attaching the apparatus of FIG. 1 to the lens of a conventional transparency projector, placing polarising filters over the left and right halves of the aperture 14 of the apparatus 1, so as to cross-polarise the left and right eye images, projecting the polarised images onto a metallic screen and viewing the projected image using correspondingly polarised filters or glasses. The use of the polarising filters and polarising glasses ensures that the corresponding eye of an observer only receives the corresponding projected left or right eye image. As previously described, by selection of an appropriate lens construction the apparatus 1 as shown in FIG. 1 may be integrated within the lens of the projector such that no additional attachments are required in order to view the recorded left and right eye images.

To view the recorded left and right images when they have been recorded on print film or video tape, or a live feed from a video camera, as well as viewing images recorded as film transparencies as described above, necessitates the use of further viewing apparatus. A part of the necessary further viewing apparatus is shown in FIG. 6. A viewing device essentially comprises a box 36 that has two apertures formed in adjacent two sides of the box. A first aperture 38 is used to introduce light rays from the recorded left and right eye images as will be described in more detail below. Otherwise the box 36 is light tight. Located within the box at an angle to each of the sides is a two way mirror 40. The two way mirror is located so as to divide the box into two halves, with the first aperture 38 being located in one half and a second aperture 42 in a second side of the box is located in the other half. In use, the light rays from the left and right eye images are directed through the first aperture 38 so that they are incident upon the reflective side of the two way mirror 40. The mirror 40 is angled such that the combined image from the light rays is projected onto the inside surface of the rear wall 44 of the box. Although depicted as a plane mirror, the mirror 40 may be a convex or parabolic mirror. The projected image is viewed by an observer through the second aperture 42, looking through the two way mirror 40. The viewing box 36 may also be used with a slide or cine projector.

Referring to FIG. 7, the viewing box 36 is shown as seen by an observer looking towards the aperture 42. The apparatus 1 of the present invention is located to the left of the viewing box 36 such that the light rays 45 from the left and right images are introduced to the viewing box 36 through the first aperture 38. Coupled to the apparatus 1 is a conventional camera lens 46, which is in turn coupled via a light tight connecting tube 50 to another camera lens 48. The two lenses 46 and 48 are arranged with their rear lens groups facing one another with a field lens placed at the focal plane such that an image focussed by the second lens 48 is in effect projected through the first lens 46. The second lens 48 is connected to a light gathering box 52 that houses a plane mirror that directs light rays received from a photographic print 54 or video display screen into the arrangement of first and second lenses 46 and 48. The photographic print 54 is sufficiently illuminated by either natural light or an artificial light source such that the second lens 48 effectively transfers the light rays to the projection lens 46. The image is then projected into the viewing box as described with reference to FIG. 6. The internal path of the light rays within the viewing box 36 is schematically illustrated in FIG. 8, which shows the viewing box 36 and apparatus in FIG. 1 in plan view.

As an alternative to the use of polarising filters and individual polarising glasses by each observer, the three-dimensional impression may also be viewed by providing an autocollimating screen on the rear wall 44 of the viewing box 36. It will be appreciated that the rear wall 44 of the box may not be fixed, or indeed may be transparent, allowing the light rays to be projected at a variable distance from the observer. An autocollimating screen such as the front projection screen material manufactured by 3M company comprises a plurality of tiny spheres that have the optical property that they redirect light that is incident on them back along the axis of the light ray. The effect of this property is that the left and right eye images projected onto the rear wall 44 by the two way mirror 40 are reflected to an observer looking through aperture 42 in a highly directional manner. This means that if the observer is positioned correctly in front of the second aperture 42, left eye images directed by the lens elements of the screen will only be seen by the left eye of the observer, and equally the right eye images will only be seen by the right eye of the observer. This therefore allows the observer to see the three-dimensional image without the use of polarising filters, i.e. with the naked eyes.

A camera lens placed in the position of the viewer and aligned correctly along the corresponding axes of the projection apparatus will be able to record either the left or the right eye image reflected from the projection screen and with a 3D apparatus attached to the camera lens both stereoscopic images may be recorded simultaneously. Moreover a subject placed within the field of view of the 3D apparatus and lit appropriately will be recorded as a three-dimensional composite image, i.e. it will blend in and become a part of the projected image. This can be particularly effective when the projected image has some foreground elements as well as the distant background and the "subject" is placed at middle distance. By the manipulation of the convergence points the "subject" can be integrated seamlessly into the projected image.

Direct three-dimensional viewing of a scene in real time is also possible with the use of the viewing box—acting in effect as a three-dimensional periscope. The light gathering box 52 which houses a front-surface mirror is replaced by a second apparatus which may be identical to the apparatus 1 used to project the image through aperture 38 onto screen 44. Lens 48 and 46 transfer the image from the imaging (image acquisition) apparatus to the projecting apparatus 1. In fact lens 48 forms part of the 3D imaging apparatus and lens 46 forms part of the 3D projecting apparatus.

What is claimed is:

1. An apparatus for providing left and right eye images with a horizontal angle of view of at least approximately 45° along the axis of a single camera lens, the apparatus comprising:

optical means arranged to provide said left and right eye images as a pair of head-to-head or toe-to-toe images such as with the two images separated by a center line and with either the tops of the two images or the bottoms of the two images respectively residing adjacent the center line, so that the left and right eye images are simultaneously recorded onto a single frame of a recording medium;

said optical means includes two reflecting elements for each of the two images respectively with the reflecting elements being positioned in front of a camera lens;

said reflecting elements include first and second reflecting elements arranged to receive the left and right eye images respectively and further including third and fourth reflecting elements arranged to receive said left and right eye images from said first and second reflecting elements to provide said left and right eye images along the axis of a camera lens;

said first and second reflecting elements comprise plane mirrors and said third and fourth reflecting elements comprise two faces of a triangular prism;

said plane mirrors each being arranged to reflect the light rays of the left and right eye images respectively onto opposing faces of said triangular prism with said triangular prism arranged to redirect said incident light rays towards said camera lens whose axis is at 90° to the direction of view of said first and second reflecting elements; and an optical element arranged to extend the horizontal angle of view of the apparatus, the optical element comprising a pair of optically identical first lenses or lens groups of negative optical power, each first lens and lens group being located along the respective axis of the left and right eye images and in front of said first and second reflecting elements.

2. An apparatus for providing left and right eye images with a horizontal angle of view of at least approximately 45° along the axis of a single camera lens, the apparatus comprising:

optical means arranged to provide said left and right eye images as a pair of head-to-head or toe-to-toe images such as with the two images separated by a center line and with either the tops of the two images or the bottoms of the two images respectively residing adjacent the center line, so that the left and right eye images are simultaneously recorded onto a single frame of a recording medium;

said optical means includes two reflecting elements for each of the two images respectively with the reflecting elements being positioned in front of a camera lens;

said reflecting elements include first and second reflecting elements arranged to receive the left and right eye images respectively and further including third and fourth reflecting elements arranged to receive said left and right eye images from said first and second reflecting elements to provide said left and right eye images along the axis of a camera lens;

said first and second reflecting elements comprise plane mirrors and said third and fourth reflecting elements comprise two faces of a triangular prism;

said plane mirrors each being arranged to reflect the light rays of the left and right eye images respectively onto opposing faces of said triangular prism with said triangular prism arranged to redirect said incident light rays towards said camera lens whose axis is at 90° to the direction of view of said first and second reflecting elements; and the optical element also comprises a second lens or lens group of positive power, located along the axis between the camera lens and third and fourth reflecting elements such that both left and right eye images are incident on the second lens or lens group.

3. An apparatus for providing left and right eye images with a horizontal angle of view of at least approximately 45° along the axis of a single camera lens, the apparatus comprising:

optical means arranged to provide said left and right eye images as a pair of head-to-head or toe-to-toe images such as with the two images separated by a center line and with either the tops of the two images or the bottoms of the two images respectively residing adjacent the center line, so that the left and right eye images are simultaneously recorded onto a single frame of a recording medium;

said optical means includes two reflecting elements for each of the two images respectively with the reflecting elements being positioned in front of a camera lens;

said reflecting elements include first and second reflecting elements arranged to receive the left and right eye images respectively and further including third and fourth reflecting elements arranged to receive said left and right eye images from said first and second reflecting elements to provide said left and right eye images along the axis of a camera lens;

said first and second reflecting elements comprise plane mirrors and said third and fourth reflecting elements comprise two faces of a triangular prism;

said plane mirrors each being arranged to reflect the light rays of the left and right eye images respectively onto opposing faces of said triangular prism with said triangular prism arranged to redirect said incident light rays towards said camera lens whose axis is at 90° to the direction of view of said first and second reflecting elements;

the optical element also comprises a second lens or lens group of positive power, located along the axis between the camera lens and third and fourth reflecting elements such that both left and right eye images are incident on the second lens or lens group; and said first lens group comprises a pair of individual halves of an optical element, each half optical element being placed in front of said first and second reflecting elements in correct alignment with the optical axis of the camera lens.

4. An apparatus for providing left and right eye images with a horizontal angle of view of at least approximately 45° along the axis of a single camera lens, the apparatus comprising:

optical means arranged to provide said left and right eye images as a pair of head-to-head or toe-to-toe images such as with the two images separated by a center line and with either the tops of the two images or the bottoms of the two images respectively residing adjacent the center line, so that the left and right eye images are simultaneously recorded onto a single frame of a recording medium;

said optical means includes two reflecting elements for each of the two images respectively with the reflecting elements being positioned in front of a camera lens;

said reflecting elements include first and second reflecting elements arranged to receive the left and right eye images respectively and further including third and fourth reflecting elements arranged to receive said left and right eye images from said first and second reflecting elements to provide said left and right eye images along the axis of a camera lens;

said first and second reflecting elements comprise plane mirrors and said third and fourth reflecting elements comprise two faces of a triangular prism;

said plane mirrors each being arranged to reflect the light rays of the left and right eye images respectively onto opposing faces of said triangular prism with said triangular prism arranged to redirect said incident light rays towards said camera lens whose axis is at 90° to the direction of view of said first and second reflecting elements;

the optical element also comprises a second lens or lens group of positive power, located along the axis between the camera lens and third and fourth reflecting elements such that both left and right eye images are incident on the second lens or lens group; and both halves of said first optical element are coupled to a convergence adjustment means so that operation of said convergence adjustment means causes adjustment of the two halves of said first optical element.

5. A stereoscopic attachment for a camera or projector for providing left and right eye images with a horizontal angle of view of approximately 45 degrees along the axis of a single camera lens, the apparatus comprising:

optical means arranged to provide said left and right images as a pair of head-to-head or toe-to-toe images such as with the two images separated by a center line and with either the tops of the two images or the bottoms of the two images respectively residing adjacent the center line, so that the left and right eye images are simultaneously recorded onto a single frame of a recording medium;

said optical means includes two reflecting elements for each of the two images respectively with the reflecting elements being positioned in front of a camera lens;

said reflecting elements include first and second reflecting elements arranged to receive the left and right eye images respectively and further including third and fourth reflecting elements arranged to receive said left and right images from said first and second reflecting elements to provide said left and right eye images along the axis of a camera lens;

said first and second reflecting elements comprise plane mirrors and said third and fourth reflecting elements comprise two smaller plane mirrors adjacent to each other and positioned at a specific angle to each other in shape of a roof prism with the apex facing the imaging lens and in alignment with the optical center of the said lens;

said first and second plane mirrors each being arranged to reflect the light rays of the left and right eye images respectively onto corresponding plane mirrors of the roof prism with said mirrors arranged to reflect the incident light rays towards said camera lens whose axis is set at 90 degrees to the direction of view of said first and second reflecting elements;

an optical element arranged to extend the horizontal angle of view of the apparatus, the optical element comprising a pair of optically identical first lenses or lens groups of negative optical power, each first lens and lens group being located along the respective axis of the left and right eye images and in front of the said first and second reflecting elements;

the optical element also comprises a second lens or lens group of positive power, located along the axis between the camera lens and third and fourth reflecting elements such that both left and right eye images are incident on the second lens or lens group; and both halves of said first optical element are coupled to a convergence adjustment means so that operation of said convergence adjustment means causes adjustment of the two halves of said first optical element.

* * * * *